US012705189B2

(12) United States Patent
Baronne et al.

(10) Patent No.: US 12,705,189 B2
(45) Date of Patent: Aug. 11, 2026

(54) PEER-TO-PEER MEMORY ACCESS REQUEST FOR MEMORY DEVICES

(71) Applicant: Micron Technology, Inc., Boise, ID (US)

(72) Inventors: Christopher Anthony Baronne, Allen, TX (US); Michael Keith Dugan, Richardson, TX (US); Bryan Dale Hornung, Plano, TX (US); Dean Elliott Walker, Allen, TX (US); Craig William Warner, Coppell, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/008,491

(22) Filed: Jan. 2, 2025

(65) Prior Publication Data

US 2025/0225084 A1 Jul. 10, 2025

Related U.S. Application Data

(60) Provisional application No. 63/618,970, filed on Jan. 9, 2024.

(51) Int. Cl.
*G06F 13/16* (2006.01)
*G06F 13/10* (2006.01)
*G06F 13/42* (2006.01)

(52) U.S. Cl.
CPC .............. *G06F 13/16* (2013.01); *G06F 13/10* (2013.01); *G06F 13/4221* (2013.01); *G06F 2213/0026* (2013.01)

(58) Field of Classification Search
CPC ...... G06F 13/16; G06F 13/10; G06F 13/4221; G06F 2213/0026; G06F 12/0802
See application file for complete search history.

(56) References Cited

U.S. PATENT DOCUMENTS

| | | | | |
|---|---|---|---|---|
| 10,585,827 | B1 * | 3/2020 | Cannata | G06F 13/4022 |
| 2006/0075147 | A1 * | 4/2006 | Schoinas | G06F 12/1027 710/22 |
| 2020/0134208 | A1 * | 4/2020 | Pappachan | G06F 12/1441 |
| 2020/0341766 | A1 * | 10/2020 | White | G06F 12/0835 |
| 2022/0075729 | A1 * | 3/2022 | Kabra | G06F 12/0873 |
| 2022/0222182 | A1 * | 7/2022 | Sharma | G06F 9/45558 |
| 2022/0292027 | A1 * | 9/2022 | Hornung | G06F 12/10 |
| 2022/0405212 | A1 * | 12/2022 | Kakaiya | G06F 12/1425 |
| 2023/0376422 | A1 * | 11/2023 | Watanabe | G06F 3/0659 |

OTHER PUBLICATIONS

WO-2016154789-A1, Oct. 6, 2016, Chen, Yun, (Year: 2016).*

* cited by examiner

*Primary Examiner* — Farley Abad
(74) *Attorney, Agent, or Firm* — Lowenstein Sandler LLP

(57) ABSTRACT

A memory access request is initiated by a first peripheral device. The memory access request includes a virtual address. A host physical address (HPA) associated with the virtual address is determined. An identifier of a base address register (BAR) associated with the HPA is determined by the first peripheral device. The memory access request is transmitted using the identifier of the BAR to a second peripheral device.

20 Claims, 5 Drawing Sheets

400

Initiate, by a first peripheral device, a memory access request, wherein the memory access request includes a virtual address.

410

Determine, by the first peripheral device, a host physical address (HPA) associated with the virtual address.

420

Determine, by the first peripheral device, an identifier of a base address register (BAR) associated with the HPA.

430

Transmit the memory access request specifying the identifier of the BAR to a second peripheral device.

440

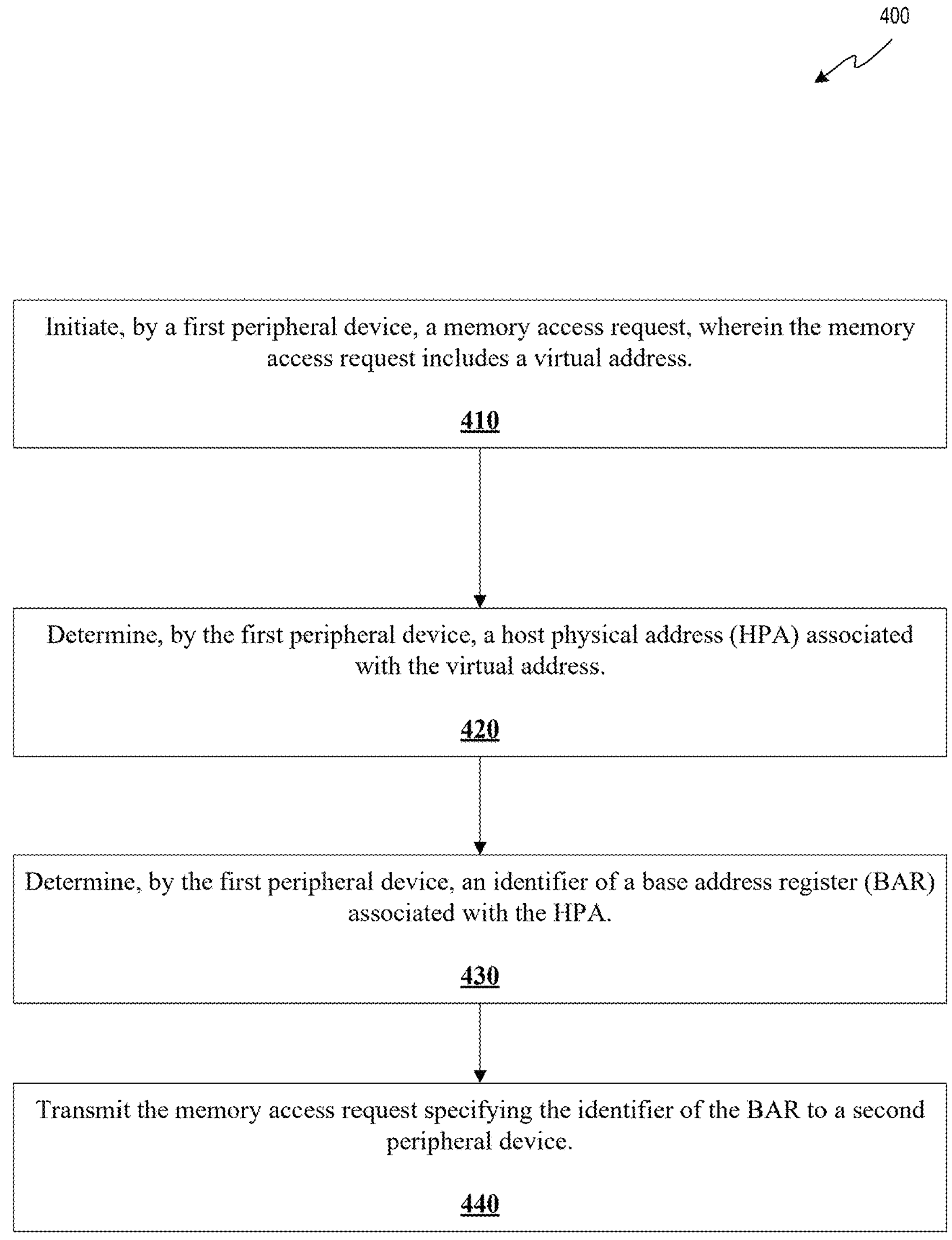

FIG. 4

PEER-TO-PEER MEMORY ACCESS REQUEST FOR MEMORY DEVICES

RELATED APPLICATIONS

This application claims the benefit of U.S. Provisional Patent Application No. 63/618,970, filed Jan. 9, 2024, which is incorporated by reference herein.

TECHNICAL FIELD

Embodiments of the disclosure relate generally to memory sub-systems, and more specifically, relate to peer-to-peer memory access requests for CXL devices.

BACKGROUND

Compute Express Link (CXL) is an interconnect protocol designed to enable high-speed communication and data sharing between processors, accelerators, memory, and other devices in a computer system. CXL devices play a crucial role in extending the capabilities and performance of the computer system. They are interconnected using the CXL protocol, which enables seamless integration and interoperability among the components within the computer CXL system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram of an example method of peer-to-peer memory access requests for CXL devices in accordance with some embodiments of the present disclosure.

DETAILED DESCRIPTION

Figure 1:
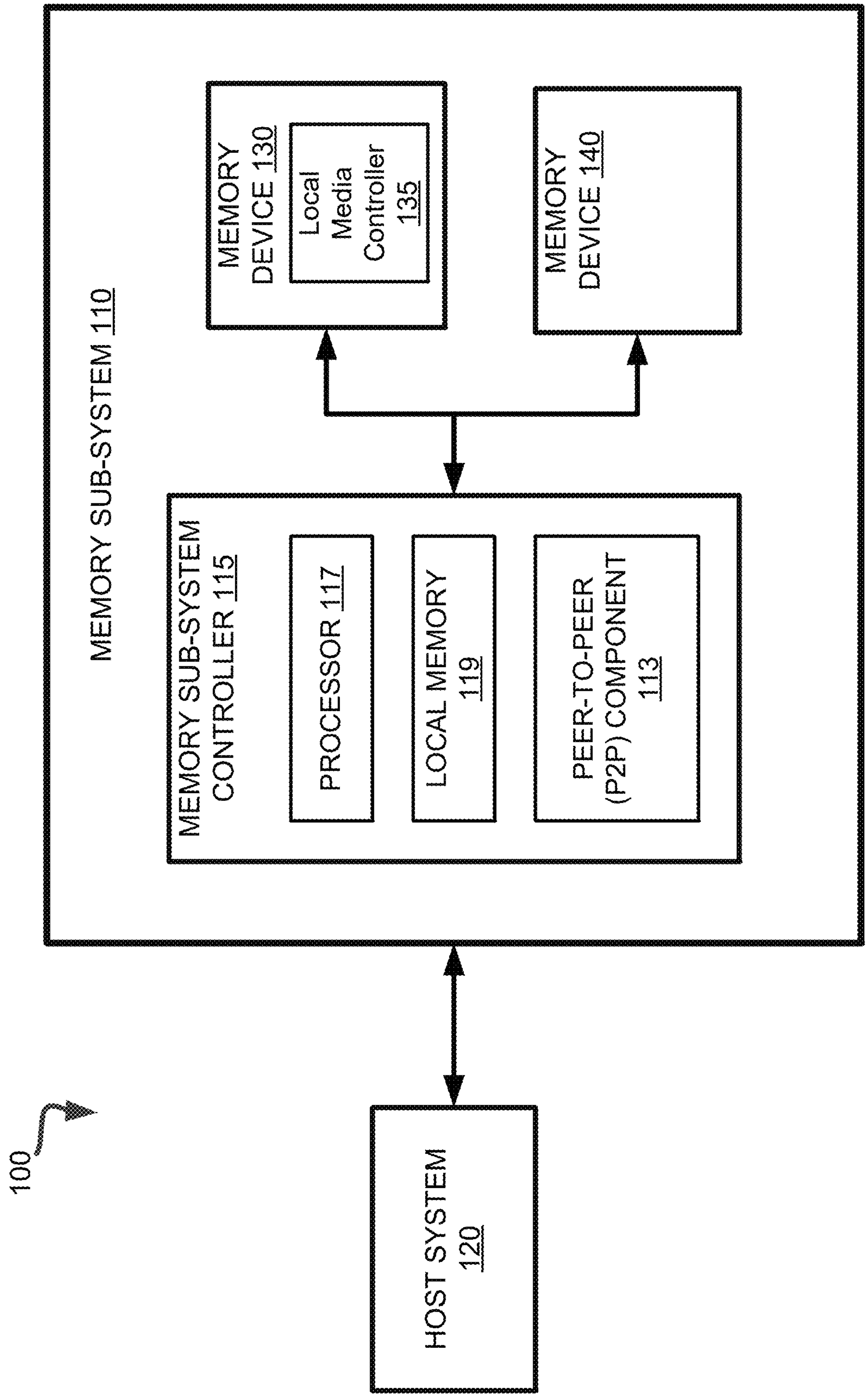
FIG. 1 illustrates an example computing system that includes a memory sub-system in accordance with some embodiments of the present disclosure.

Aspects of the present disclosure are directed to peer-to-peer memory access requests for CXL devices (e.g., memory sub-systems). A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can includes of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. Memory cells can be formed onto a silicon wafer in an array of columns connected by conductive lines (also hereinafter referred to as bitlines, or BLs) and rows connected by conductive lines (also hereinafter referred to as wordlines or WLs). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

In some systems, peripheral devices, such as accelerators, with one or more attached device memories that are connected using a Compute Express Link (CXL) interface ("CXL devices") enable high-speed communication and data sharing. CXL is built on the serial PCI Express (PCIe) physical and electrical interface and includes PCIe-based block input/output protocol (CXL.io) and new cache-coherent protocols for accessing system memory (CXL.cache) and device memory (CXL.mem). CXL devices may rely on coherent access to host system memory through CXL cache, and the host system may access local memory of the CXL devices through CXL.mem. Accordingly, CXL devices have local address space that is visible and accessible to the host system memory through CXL.mem transactions. However, local address space of CXL devices connected to a common host system is not visible or directly accessible by other CXL devices.

In some instances, a host system may utilize multiple CXL devices concurrently, thus the memory in use by that host system may be spread across the multiple CXL devices. One or more of the multiple CXL devices may contain compute capable of sourcing memory requests which require memory that is located on a peer device (e.g., local address space). Thus, in order for CXL devices to access the local address space of other CXL devices, a virtual address of a memory request issued by a requesting CXL device addressing a local address space of a peer CXL device (e.g., another CXL device attached to the host system) is translated into a host physical address (HPA). The requesting CXL device, using the HPA, sends the request as a host memory request to the host system through CXL.cache. The host system sends a CXL command, including the host memory request to the peer CXL device indicated in the host memory request via a CXL.mem transaction. CXL.mem transactions allows a host system to coherently access cached device memory with load/store commands for both volatile (RAM) and persistent non-volatile (flash memory) storage. The peer CXL device receives and processes the CXL command to generate a response, including requested data (in the case of a read operation) or an acknowledgment (in the case of a write operation). The peer CXL device sends the response back to the host system. The host system then sends the response received by the peer CXL device to the requesting CXL device. Requiring a CXL device to utilize the host system as an intermediary for memory requests addressing a local address space of the peer CXL device (e.g., peer-to-peer virtually addressed device memory requests) may be inefficient as it may increase the latency of accessing the local address space of the peer CXL device.

Aspects of the present disclosure address the above and other deficiencies by enabling a CXL device to directly communicate its memory access requests to other CXL devices. In one embodiment, a requesting CXL device initiates a memory access request directed to a target CXL device. The requesting CXL device receives from a host system a host physical address translated from a virtual address of the memory access request. The requesting CXL device translates the host physical address to an identifier of a Base Address Register (BAR), which specifies the base address of a region of memory within the target CXL device accessible by the target CXL device. The requesting CXL device transmits the memory access request, using the identifier of the BAR, to the target CXL device via a CXL.io interface. The target CXL device receives, via CXL.io interface, the transmitted memory access request and processes the memory access request. The target CXL device transmits, to the requesting CXL device, a response indicating the status and relevant information derived from processing the memory access request.

Advantages of the present disclosure include, but are not limited to, providing peer-to-peer virtually addressed device memory requests between CXL devices through CXL.io interface, thereby reducing overall latency, increasing CXL device to CXL device bandwidth, and increasing available bandwidth between the host system and CXL devices in both directions.

FIG. 1 illustrates an example computing system 100 that includes a memory sub-system 110 in accordance with some embodiments of the present disclosure. The memory sub-system 110 can include media, such as one or more volatile memory devices (e.g., memory device 113), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, “coupled to” or “coupled with” generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 113 can include any combination of the different types of non-volatile memory devices and/or volatile memory devices. The volatile memory devices (e.g., memory device 113) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a peer-to-peer (P2P) component 113 that can perform peer-to-peer memory access requests. A memory access request may be initiated specifying a virtual address to access (e.g., read or write data). The P2P component 113 generates a translation request (e.g., address translation service (ATS) request) to transmit to the host system 120 via a CXL link. The translation request specifies the virtual address that needs to be translated. The P2P component 113 receives from the host system 120 a translation response (e.g., ATS response) that contains the CXL host-managed device memory (HDM) HPA. More specifically, the host system 120 receives the translation request and processes it by querying a translation table of the host system 120. Host system 120 obtains from the translation table the HPA (e.g., CXL HDM HPA) corresponding to the virtual address of the translation request. Host system 120 generates the translation response (e.g., ATS response) that contains the CXL HDM HPA. Host system 120 transmits the translation response back to the P2P component 113. The P2P component 113 may determine that the CXL HDM HPA does not belong to an address space of the host system 120 or memory device 130 and/or 140. In other words, the CXL HDM HPA belongs to the address space of a target memory device of another memory sub-system.

Memory sub-system controller 115 may include a physical address translation data structure (e.g., preconfigured PA translation table) that translates CXL HDM HPAs to the identifiers of the BARs. In some embodiments, the local memory 119 may store the preconfigured physical address translation data structure. P2P component 113 of the memory sub-system 110 and other memory sub-systems may generate, during initialization, the preconfigured PA translation table by receiving, from the host system 120, CXL HDM HPAs mapped to regions of device memory of all memory sub-systems which may further include size, and the identifiers of the BARs mapped to regions of device memory of the memory sub-systems (e.g., memory device 130 and/or 140). P2P component 113 maps the CXL HDM HPAs to the identifiers of the BARs based on matching regions of device memory. In some embodiments, the CXL HDM HPAs and the BARs may be on the same or different tables. Responsive to determining that the CXL HDM HPA belongs to an address space other than the host system 120 or memory devices 130 and/or 140 of the memory sub-system 110, P2P component 113 translates, using the preconfigured PA translation table, the CXL HDM HPA to an identifier of a BAR. For example, to determine that the CXL HDM HPA belongs to an address space other than the host system 120 or memory devices 130 and/or 140 of the memory sub-system 110, P2P component 113 performs a range check on the preconfigured PA translation table using the CXL HDM HPA to determine if it falls into a range of any other device. The identifier of the BAR corresponds to a location on another memory sub-system (e.g., target memory sub-system). P2P component 113 sends, via CXL.io interface, the memory access request to the target memory sub-system using the identifier of the BAR. In some embodiments, the memory sub-system 110 receives responses associated with the memory access request directly from the target memory sub-system via CXL.io interface by including a request tag indicating that the memory sub-system 110 sent the memory access request.

Figure 2:
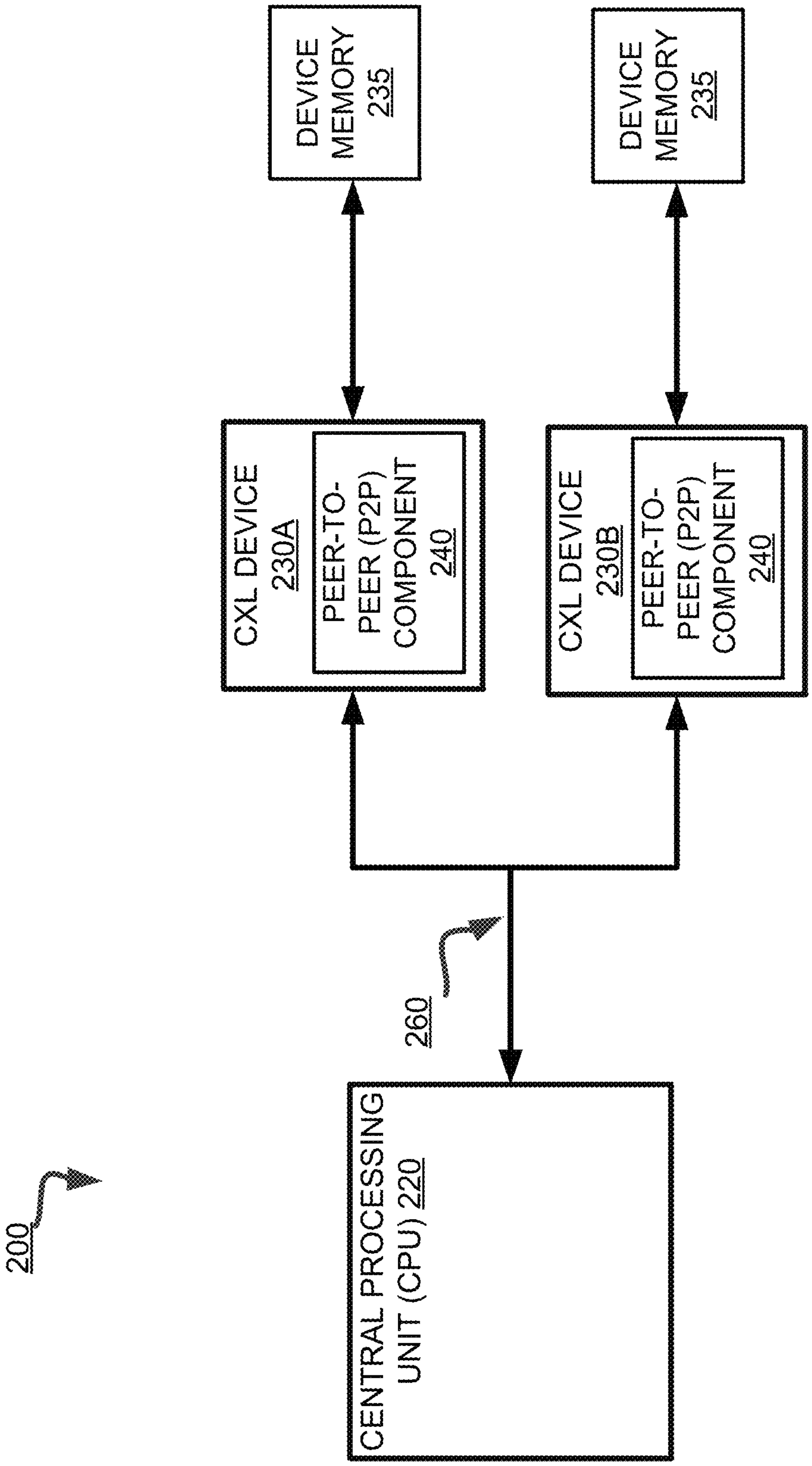
FIG. 2 illustrates an example CXL device in accordance with some embodiments of the present disclosure.

FIG. 2 illustrates an example CXL system 200 (e.g., system 200) in accordance with some embodiments of the present disclosure. System 200 includes a central processing unit (CPU) 220 (e.g., host CPU 220) and one or more CXL device(s) (e.g., CXL device 230A and CXL device 230B).

Host central processing unit (CPU) 220 is a central processing unit that is responsible for executing instructions, performing computations, and managing the CXL system. The host CPU 220 manages and coordinates communication and data transfer between the host CPU 220 and CXL device(s) (e.g., CXL device 230A and/or CXL device 230B) via CXL link 260. CXL link 260 operates as a bidirectional serial link that enables high-speed data transfer and communication between the host CPU 220 and CXL device(s), which provides an exchange of commands, data, and control signals.

Host CPU 220 may include a memory controller that facilitates communication between the host CPU 220 and a memory of the host CPU 220 (e.g., host memory). Communication between the host CPU 220 and host memory can include data transfer, address translation (e.g., translation of virtual addresses generated by the host CPU into physical addresses that correspond to specific locations in host memory), and memory access operations (e.g., read and write operations). Host memory may be any combination of the different types of non-volatile memory devices and/or volatile memory devices. The volatile memory devices can be but are not limited to, random access memory (RAM), such as dynamic random access memory (DRAM) and synchronous dynamic random access memory (SDRAM). The non-volatile memory devices can be a not-and (NAND) type flash memory and write-in-place memory, such as a three-dimensional cross-point ("3D cross-point") memory device, which is a cross-point array of non-volatile memory cells. NAND-type flash memory includes, for example, two-dimensional NAND (2D NAND) and three-dimensional NAND (3D NAND).

CXL device(s) (e.g., CXL device 230A and/or CXL device 230B) may be an accelerator, such as a GPU, ASIC, or FPGA. Device memory (or memories) 235 may be attached to the CXL device 230A and/or CXL device 230B. The device memory 235 may be volatile memory such as, but not limited to, random access memory (RAM), such as dynamic random access memory (DRAM) and synchronous dynamic random access memory (SDRAM).

Host CPU 220 includes CXL host-managed device memory (HDM) registers that manage the memory resources of the CXL device 230A and/or CXL device 230B. Host CPU 220 utilizes the CXL HDM registers to set a range of CXL HDM Host Physical Addresses (HPAs) for each CXL device (e.g., CXL device 230A and CXL device 230B) of system 200. In particular, host CPU 220 designates a specific range of CXL HDM HPAs to be assigned and used by each CXL device (e.g., CXL device 230A and CXL device 230B) for memory operations. Each CXL HDM HPA of the range corresponds to a specific location in the device memory of the CXL device (e.g., device memory 235 of CXL device 230A or device memory 235 of CXL device 230B). Host CPU 220 manages mappings between virtual addresses used by the CXL device(s) of system 200 and the CXL HDM HPAs to ensure that the CXL device(s) of system 200 can access regions of their device memory (e.g., device memory 235 of CXL device 230A or device memory 235 of CXL device 230B) by translating their virtual addresses to corresponding CXL HDM HPAs.

CXL device 230A and/or CXL device 230B includes Base Address Registers (BARs) used to communicate specific resource requirements, such as a memory-mapped region. Host CPU 220 assigns a range of physical addresses (e.g., identifiers of BARs) to BARs of the CXL device(s) of system 200, indicating locations in which a region of the device memory of the CXL device(s) (e.g., device memory 235 CXL device 230A and/or device memory 235 of CXL device 230B) is mapped. Host CPU 220 manages mappings between The identifiers of the BARs and the regions of the device memory of CXL device(s).

CXL device 230A and CXL device 230B include a peer-to-peer (P2P) component 113 that can perform peer-to-peer memory access requests. CXL device 230A (e.g., requesting CXL device) may initiate a memory access request specifying a virtual address the CXL device 230A wants to access (e.g., read or write data). CXL device 230A generates a translation request (e.g., address translation service (ATS) request) to transmit to the host CPU 220 via the CXL link 260. The translation request specifies the virtual address that needs to be translated. Host CPU 220 receives the translation request and processes it by querying a translation table of the host CPU 220. Host CPU 220 obtains from the translation table the HPA (e.g., CXL HDM HPA) corresponding to the virtual address of the translation request. Host CPU 220 generates a translation response (e.g., ATS response) that contains the CXL HDM HPA. Host CPU 220 transmits the translation response back to CXL device 230A. Typically, the CXL device 230A could use the CXL HDM HPA of the translation response to perform the memory access request. However, P2P component 113 may determine that the CXL HDM HPA does not belong to an address space of the host CPU 220 or CXL device 230A. In other words, the CXL HDM HPA belongs to an address space of a target CXL device (e.g., CXL device 230B).

CXL device 230A and/or CXL device 230B may include a preconfigured physical address translation data structure (e.g., preconfigured PA translation table) that translates CXL HDM HPAs to the identifiers of the BARs. P2P component 113 of CXL device 230A and/or CXL device 230B may generate, during initialization, the preconfigured PA translation table by receiving, from the host CPU 220, CXL HDM HPAs mapped to regions of device memory of all CXL device(s) of system 200, and the identifiers of the BARs mapped to regions of device memory of all CXL device(s) of system 200. P2P component 113 maps the CXL HDM HPAs to the identifiers of the BARs based on matching regions of device memory. Responsive to determining that the CXL HDM HPA belongs to an address space other than the host CPU 220 or CXL device 230A, P2P component 113 translates, using the preconfigured PA translation table, the CXL HDM HPA to an identifier of a BAR. The identifier of the BAR corresponds to a location on CXL device 230B (e.g., target CXL device). P2P component 113 sends, via CXL.io interface, the memory access request to the CXL device 230B using the identifier of the BAR.

CXL device 230B may receive and process the memory access request. CXL device 230B generates a response including relevant information, such as the status and outcome of the operation. The memory access request may include a request tag indicating CXL device 230A that sent the memory access request and returns, via CXL.io interface, the response directly to CXL device 230A.

Figure 3:
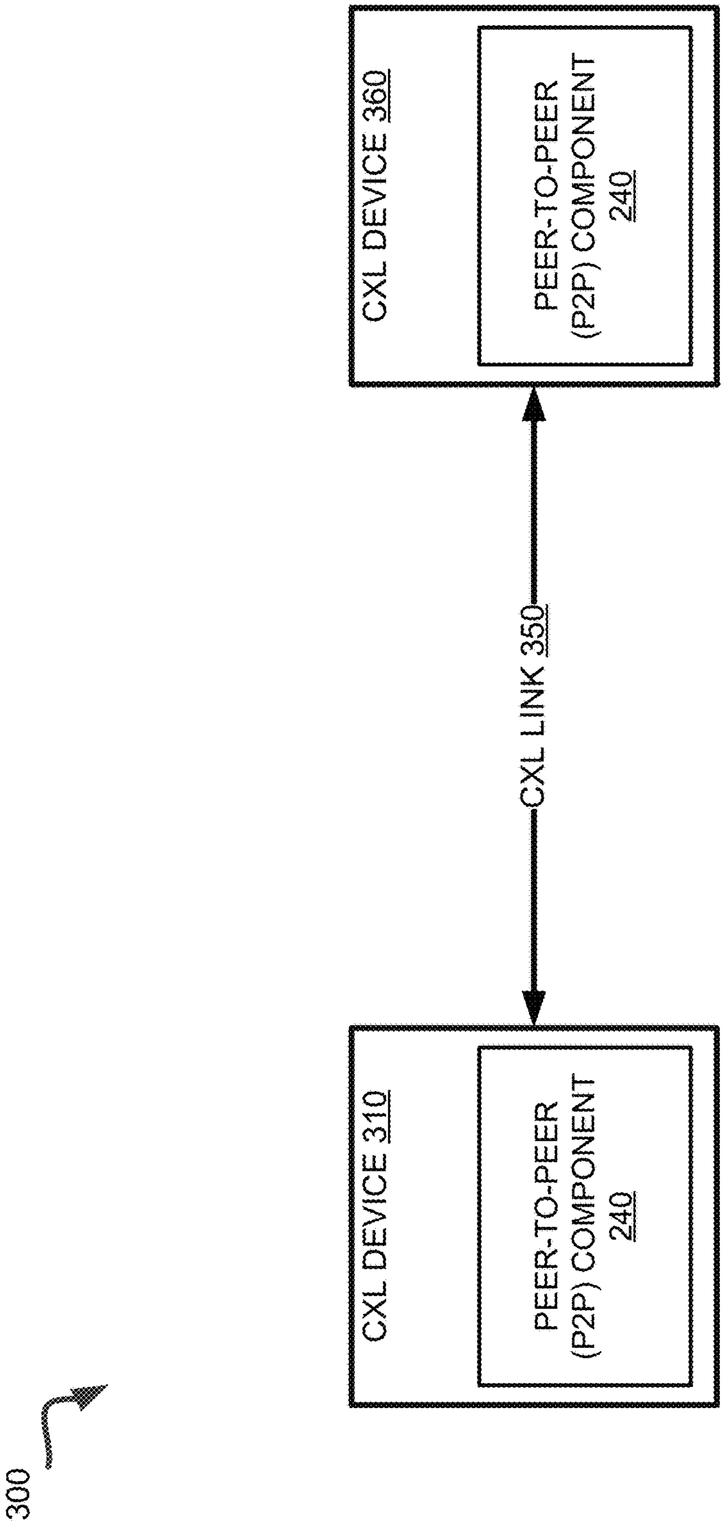
FIG. 3 illustrates an example CXL system that includes at least one CXL device of FIG. 1 in accordance with some embodiments of the present disclosure.

FIG. 3 illustrates an example CXL system 300 (e.g., system 300) in accordance with some embodiments of the present disclosure. System 100 includes a requesting CXL device 310 and a target CXL device 360 coupled via a CXL link 350. Requesting CXL device 310 and target CXL device 360 is similar to CXL device 130A and CXL device 130B of FIG. 1.

Requesting CXL device 310 initiates a memory access request specifying a virtual address. Since host CPU 110 of FIG. 1 has mapped the memories of requesting CXL device 310 and the target CXL device 360 into the host CPU 110 HDM HPA, requesting CXL device 310 communicates with a host CPU to obtain a CXL HDM HPA associated with the virtual address. P2P component 113 of the requesting CXL device 310 determines that the CXL HDM HPA does not match a CXL HDM HPA of the host CPU or the requesting CXL device 220. P2P component 113 of the requesting CXL device 310 translates the CXL HDM HPA to an identifier of a BAR using a preconfigured PA translation table stored in the requesting CXL device 310, as previously described. Requesting CXL device 310 sends the initiated memory access request to the target CXL device 360 using the identifier of the BAR via CXL.io interface.

Target CXL device 360 receives the initiated memory access request sent by the requesting CXL device 310. Target CXL device 360 processes the memory access request. For example, if the memory access request specifies a read operation, target CXL device 360 reads data from a location of the device memory attached to target CXL device 360 identified by the identifier of the BAR. In another example, if the memory access request specifies a write operation, target CXL device 360 parses data from the memory access request to write to a location of the device memory attached to target CXL device 360 identified by the identifier of the BAR. Once the memory request is processed, target CXL device 360 generates a response indicating the status of the memory access request (e.g., successful or failed) and data associated with the memory access request (e.g., read data). P2P component 113 of the target CXL device 360 transmits the response back to the requesting CXL device 310. In an example, the target CXL device may maintain state information indicating information about the original request in order to route the response back to the original requestor (e.g., the requesting CXL device 310).

FIG. 4 is a flow diagram of an example method 400 to peer-to-peer memory access requests for CXL devices, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the P2P component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic initiates a memory access request. The memory access request may include a virtual address. As previously described, the first peripheral device (e.g., CXL device 230A) initiates a memory access request specifying a virtual address the first peripheral wants to access (e.g., read or write data). In some embodiments, the first peripheral device may include at least one attached device memory (e.g., device memory 235). In some embodiments, the first peripheral device, the second peripheral device (e.g., CXL device 230B), and a host central processing unit (CPU) are connected via a CXL link.

At operation 420, the processing logic determines a host physical address (HPA) associated with the virtual address. In some embodiments, to receive the HPA, the processing logic generates a translation request. The translation request may specify the virtual address of the memory access request to be translated. The processing logic transmits, to the host CPU (e.g., CPU 220), the translation request. As previously described, the host CPU receives the translation request and processes it by querying a translation table of the host CPU. The translation table of the host CPU includes mappings between virtual addresses and host physical addresses. The processing logic receives, from the host CPU, a translation response. The translation response may include the HPA. As previously described, the HPA is based on a mapping in the translation table of the host CPU that maps the virtual address of the memory access request to the obtained HPA.

Depending on the embodiment, the HPA may be obtained from an address translation cache (ATC) using the virtual address. In particular, The ATC is a cache structure within the first peripheral device that stores virtual addresses and the physical addresses such that a requestor (e.g., the first peripheral device) may use the virtual address to identify an existing physical address translation is locally cached. In some instances, the first peripheral device populates the ATC after each translation request with the virtual address to HPA translation to avoid subsequent need for translation requests. Additionally, and/or alternatively, in the event the host system has access to the ATC via the first peripheral device's exposed configuration space, the host system may pre-program the first peripheral device's ATC with translations such that accesses to a pre-programmed translation do not require a translation request.

At operation 430, the processing logic determines an identifier of a base address register (BAR) associated with the HPA. Obtaining the identifier of the BAR includes determining whether the HPA is a physical address of the host CPU or the first peripheral device. Responsive to determining that the HPA is not a physical address of the host CPU or the first peripheral device, the processing logic identifies a preconfigured translation data structure. The preconfigured translation data structure may include mappings between HPAs and the identifiers of the BAR of the host CPU, first peripheral device, and second peripheral device. As previously described, the preconfigured translation data structure is stored in the first peripheral device. Depending on the embodiment, the second peripheral device may also store a preconfigured translation data structure. The processing logic queries, using the HPA, the preconfigured translation data structure to obtain the identifier of the BAR.

At operation 440, the processing logic transmits, using the identifier of the BAR, the memory access request to a second peripheral device. The memory access request may be transmitted to the second peripheral device via CXL.io interface. In some embodiments, the second peripheral device may include at least one attached device memory (e.g., device memory 235).

Depending on the embodiment, the processing logic receives, by the first peripheral device, a response from the second peripheral device via CXL.io interface. The response may indicate the status and outcome of the memory access request processed on the second peripheral device.

Figure 5:
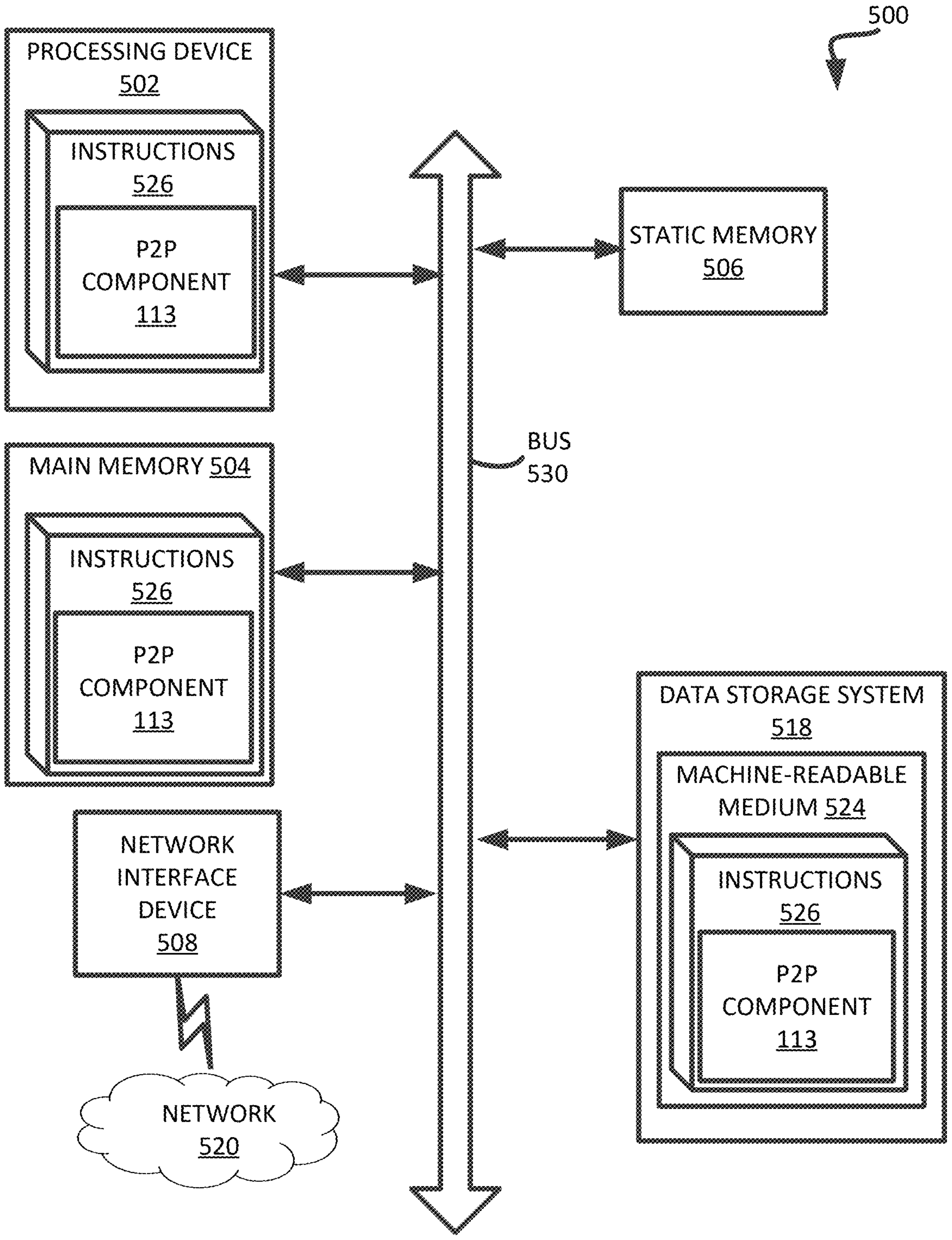
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system that includes, is coupled to, or utilizes a memory sub-system or can be used to perform the operations of a controller (e.g., to execute an operating system to perform operations corresponding to the P2P component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system.

In one embodiment, the instructions 526 include instructions to implement functionality corresponding to a P2P component (e.g., the P2P component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of memory devices; and
a processing device, operatively coupled with the plurality of memory devices, to perform operations comprising:
initiating, by a first peripheral device, a memory access request, wherein the memory access request includes a virtual address;
determining, by the first peripheral device, a host physical address (HPA) associated with the virtual address;
determining, by the first peripheral device, an identifier of a base address register (BAR) associated with the HPA; and
transmitting the memory access request specifying the identifier of the BAR to a second peripheral device.

2. The system of claim 1, wherein determining, by the first peripheral device, the HPA associated with the virtual address comprises:
generating a translation request, wherein the translation request specifies the virtual address of the memory access request to be translated;
transmitting, to a host system, the translation request; and
receiving, from the host system, a translation response, wherein the translation response includes the HPA.

3. The system of claim 1, wherein determining, by the first peripheral device, the HPA associated with the virtual address comprises obtaining for an address translation cache the HPA associated with the virtual address.

4. The system of claim 1, wherein the first peripheral device, the second peripheral device, and a host system are connected via a Compute Express Link (CXL) link.

5. The system of claim 1, wherein determining, by the first peripheral device, the identifier of the BAR associated with the HPA comprises:
determining whether the HPA is a physical address of a host system or the first peripheral device;
responsive to determining that the HPA is not a physical address of the host system or the first peripheral device, identifying a preconfigured translation data structure, wherein the preconfigured translation data structure includes mappings between HPAs and the identifiers of the BAR of the host system, first peripheral device, and second peripheral device;
querying, using the HPA, the preconfigured translation data structure for the identifier of the BAR; and
returning the identifier of the BAR.

6. The system of claim 1, wherein the memory access request is transmitted to the second peripheral device via a CXL.io interface.

7. The system of claim 1, wherein the processing device is to perform operations further comprising:
receiving, by the first peripheral device, a response from the second peripheral device via CXL.io interface, wherein the response indicates a status and outcome of the memory access request processed on the second peripheral device.

8. A method comprising:
initiating, by a first peripheral device, a memory access request, wherein the memory access request includes a virtual address;
determining, by the first peripheral device, a host physical address (HPA) associated with the virtual address;

determining, by the first peripheral device, an identifier of a base address register (BAR) associated with the HPA; and transmitting, using the identifier of the BAR, the memory access request specifying the identifier of the BAR to a second peripheral device.

9. The method of claim 8, wherein determining, by the first peripheral device, the HPA associated with the virtual address comprises:

generating a translation request, wherein the translation request specifies the virtual address of the memory access request to be translated;

transmitting, to a host system, the translation request; and receiving, from the host system, a translation response, wherein the translation response includes the HPA.

10. The method of claim 8, wherein determining, by the first peripheral device, the HPA associated with the virtual address comprises obtaining for an address translation cache the HPA associated with the virtual address.

11. The method of claim 8, wherein the first peripheral device, the second peripheral device, and a host system are connected via a Compute Express Link (CXL).

12. The method of claim 8, wherein determining, by the first peripheral device, the identifier of the BAR associated with the HPA comprises:

determining whether the HPA is a physical address of a host system or the first peripheral device;

responsive to determining that the HPA is not a physical address of the host system or the first peripheral device, identifying a preconfigured translation data structure, wherein the preconfigured translation data structure includes mappings between HPAs and the identifiers of the BAR of the host system, first peripheral device, and second peripheral device;

querying, using the HPA, the preconfigured translation data structure for the identifier of the BAR; and returning the identifier of the BAR.

13. The method of claim 8, wherein the memory access request is transmitted to the second peripheral device via a CXL.io interface.

14. The method of claim 8, further comprising:

receiving, by the first peripheral device, a response from the second peripheral device via CXL.io interface, wherein the response indicates a status and outcome of the memory access request processed on the second peripheral device.

15. A non-transitory computer-readable storage medium comprising instructions that, when executed by a processing device, cause the processing device to perform operations comprising:

initiating, by a first peripheral device, a memory access request, wherein the memory access request includes a virtual address;

determining, by the first peripheral device, a host physical address (HPA) associated with the virtual address;

determining, by the first peripheral device, an identifier of a base address register (BAR) associated with the HPA; and transmitting, using the identifier of the BAR, the memory access request to a second peripheral device.

16. The non-transitory computer-readable storage medium of claim 15, wherein determining, by the first peripheral device, a host physical address (HPA) associated with the virtual address comprises:

generating a translation request, wherein the translation request specifies the virtual address of the memory access request to be translated;

transmitting, to a host system, the translation request; and receiving, from the host system, a translation response, wherein the translation response includes the HPA.

17. The non-transitory computer-readable storage medium of claim 15, wherein the second peripheral device includes at least one attached memory device.

18. The non-transitory computer-readable storage medium of claim 15, wherein the first peripheral device, the second peripheral device, and a host system are connected via a Compute Express Link (CXL) link.

19. The non-transitory computer-readable storage medium of claim 15, wherein determining, by the first peripheral device, the identifier of the BAR associated with the HPA comprises:

determining whether the HPA is a physical address of a host system or the first peripheral device;

responsive to determining that the HPA is not a physical address of the host system or the first peripheral device, identifying a preconfigured translation data structure, wherein the preconfigured translation data structure includes mappings between HPAs and the identifiers of the BAR of the host system, first peripheral device, and second peripheral device;

querying, using the HPA, the preconfigured translation data structure for the identifier of the BAR; and returning the identifier of the BAR.

20. The non-transitory computer-readable storage medium of claim 15, wherein the memory access request is transmitted to the second peripheral device via a CXL.io interface.

* * * * *